May 12, 1964
E. DESMOND ETAL
3,132,980
METHOD OF MANUFACTURING NON-METALLIC TUBING
Filed Oct. 30, 1958
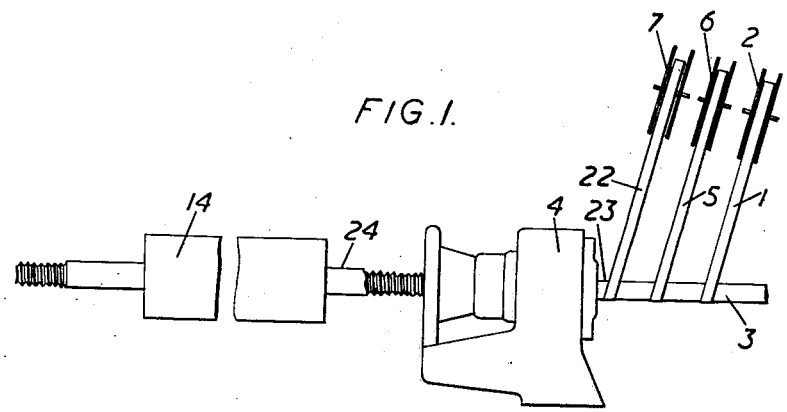
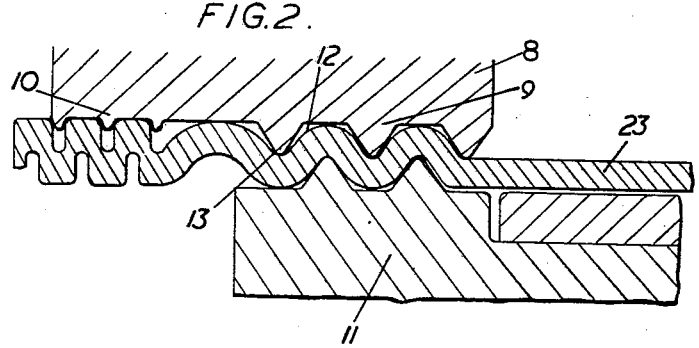
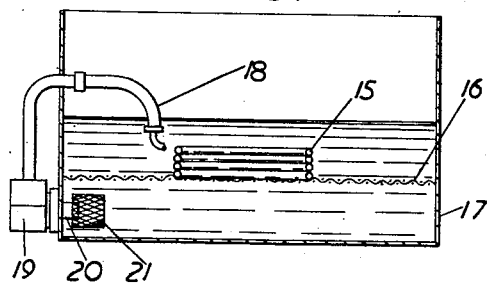
Eric Desmond
Ronald C. Major
Inventors
By
Attorneys 3,132,980
METHOD OF MANUFACTURING
NON-METALLIC TUBING
Eric Desmond, Jordans, Buckinghamshire, and Ronald C. Major, London, England, assignors to Smiths America Corporation, Washington, D.C.
Filed Oct. 30, 1958, Ser. No. 770,703
Claims priority, application Great Britain Oct. 31, 1957
10 Claims. (Cl. 156—155)

The present invention relates to the production of tubing with at least an inner wall of a flexible material. It is an object of the present invention to provide a method of manufacturing such tubing from strip material.

According to the present invention a method of manufacturing tubing with at least an inner wall of a flexible material comprises the steps of helically wrapping strip dissolvable material upon a mandrel in overlapping convolutions to form a first layer, subsequently helically wrapping strip flexible material thereupon in overlapping convolutions to form a second layer, treating the multi-layer tube so formed to bond the overlapping convolutions of the second layer together, and thereafter dissolving the first layer, the first layer being adapted to support the second layer until the treatment of the tube to bond the overlapping convolutions of the second layer is completed.

Preferably the flexible material is such that overlapping convolutions may be bonded together by the application of heat, and the step of treating the said multi-layer tube to bond the overlapping convolution of flexible material together consists of passing the tube through a hot zone so as to bond the overlapping convolutions and then allowing the tube to cool.

Preferably the flexible material comprises polymerized organic substance, e.g., poly-tetrafluorethylene (P.T.F.E.) or polyvinyl chloride (P.V.C.). The flexible material may be reinforced, e.g., with glass fibre cloth.

Preferably also the strip dissolvable material is workable, and the said multi-layer tube is formed with one or more helical ribs and grooves prior to the treatment to bond the overlapping convolutions of the second layer.

An embodiment of the present invention will now be described with reference to the accompanying drawings of which:

FIGURE 1 is a part-sectional side view of apparatus for carrying out wrapping, ribbing and grooving, and bonding operations, FIGURE 2 is an enlarged cross-sectional view of the tools which carry out the grooving operation, and FIGURE 3 is a sectional view of apparatus for dissolving the inner and outer layers of metal strip from the tubing.

Referring to FIGURE 1, aluminium strip 1 from a reel 2 is wrapped onto a stationary mandrel 3, the reel being carried by a rotating head (not shown) which causes it to rotate about the axis of mandrel 3. The wrapped strip is drawn (without rotation) into a rotating ribbing and grooving tool (indicated at 4) at a speed such that successive convolutions of the strip overlap. The layer of aluminium strip is covered by a layer of P.T.F.E. strip 5 which is wrapped on to it in similar fashion with successive convolutions overlapping from a reel 6 which is also carried by the rotating head. Finally a further layer of aluminium strip 22 is similarly wrapped onto the P.T.F.E. layer with successive convolutions overlapping from a reel 7 which is also carried by the rotating head.

The three-layer straight-walled tube 23 (FIGURE 2) so formed is drawn into tool 4 which comprises a rotating threaded die 8 having a first region 9 with a relatively coarse thread and a second region 10 with a finer thread, and a rotating tap 11, co-axial with die 8 and mandrel 3. Tap 11 has threads which correspond in pitch to those of region 9 of die 8. It is rotated (by means not shown) so that its position remains fixed in relation to die 8 with its threads aligned with the grooves between the threads of region 9.

The action of tap 11 and region 9 of die 8 provides the tube with helical ribs (12) and grooves 13. The ribbed tube passes to region 10 of die 8 where on account of the finer pitch of the threads the ribs are compressed together reducing the width of the grooves. The tube is in this way provided with relical ribs and grooves of very much finer pitch than that of the helically wrapped layers.

The ribbed tube now passes through a refractory tube 24 in a gas-fired furnace (indicated at 14). The temperature and time of heating are adjusted so that the overlapping convolutions of the P.T.F.E. strip are bonded together to form a continuous-walled tube. When the tube has cooled lengths of it are cut off as required and coiled. The coils (e.g., 15, FIGURE 3) are placed on a mesh support 16 in a tank 17 of sodium hydroxide solution. One end of coil 15 is connected to the outlet pipe 18 of a motorised pump 19 whose inlet 20 (with filter 21) lies below support 16 within tank 17. The solution is pumped through the coil and the coil is allowed to remain in the solution until the aluminium strip is entirely removed from the inner and outer surfaces of the P.T.F.E. tube. The P.T.F.E. tube is washed and dried, and either used as it stands or subjected to further manufacturing operations, such as braiding with wire to provide an appropriate degree of mechanical protection.

It will be seen that the inner aluminium layer provides essential mechanical support for the P.T.F.E. strip during the heating operation when it would otherwise be liable to collapse inwardly. The outer layer of aluminium provides additional support during this operation. The layers of aluminium also protect the P.T.F.E. strip when the tube passes through ribbing tool 4.

The strength of the tubing may be increased by employing P.T.F.E. strip reinforced by glass fibre cloth in place of the homogeneous strip. Alternatively or additionally two layers of strip may be employed in place of the single layer, the additional reel also being carried by the rotating head.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. A method of manufacturing tubing with at least one wall of a flexible non-metallic material formed of a polymerized organic substance comprising the steps of helically wrapping metallic strip on a mandrel in overlapping convolutions to form a first temporary supporting layer, the said metallic strip being readily soluble in a solvent which does not act on the said flexible material, helically wrapping the flexible material in strip form in overlapping convolutions over the first temporary layer to form a layer which will constitute the said wall, forming over the layer of flexible material a second temporary supporting layer similar to the first, applying heat to the multi-layer tube so formed to bond together the overlapping convolutions of the layer of flexible material, and dissolving out the first and second temporary layers in the said solvent, the temporary layers providing support for the layer of flexible material until the bonding is completed.

2. A method of manufacturing tubing as claimed in claim 1 wherein the said multi-layer tube is formed with helical ribs and grooves prior to the application of heat.

3. A method of manufacturing tubing as claimed in claim 2 wherein prior to the application of heat the said multi-layer tube is passed through a ribbing and grooving tool with parts, disposed inside and outside the tube, having threaded working surfaces to form the said helical ribs and grooves.

4. A method of manufacturing tubing as claimed in claim 3 wherein the pitch of the said helical ribs and grooves is smaller than that of the strip in the wrapped layers.

5. A method of manufacturing tubing as claimed in claim 4 wherein the said strip material soluble in a solvent consists of aluminium.

6. A method of manufacturing tubing as claimed in claim 2 wherein the organic substance comprises poly-tetrafluorethylene.

7. A method of manufacturing tubing as claimed in claim 6 wherein the polytetrafluorethylene is reinforced by fibre glass cloth.

8. A method of manufacturing tubing with at least one wall of a flexible non-metallic material formed of a polymerized organic substance comprising the steps of helically wrapping metallic strip on a mandrel in overlapping convolutions to form a temporary supporting layer, the said metallic strip being readily soluble in a solvent which does not act on the said flexible material, helically wrapping the flexible material in strip form in overlapping convolutions over the temporary layer to form a layer which will constitute the said wall, helically ribbing the multi-layer tube, applying heat to the tube to bond together the overlapping convolutions of the layer of flexible material, and dissolving out the temporary layer in the said solvent, the temporary layer providing support for the layer of flexible material until the bonding is completed.

9. A method of manufacturing tubing as claimed in claim 8 wherein the organic substance comprises poly-tetrafluorethylene.

10. A method of manufacturing tubing as claimed in claim 9 wherein the poly-tetrafluorethylene is reinforced by fibre glass cloth.

References Cited in the file of this patent

UNITED STATES PATENTS

| | | |
|---|---|---|
| 1,583,464 | Housekeeper | May 4, 1926 |
| 2,424,863 | Swain | July 29, 1947 |
| 2,514,597 | Daly | July 11, 1950 |
| 2,590,196 | Messinger | Mar. 25, 1952 |
| 2,608,720 | Meissner | Sept. 2, 1952 |
| 2,657,617 | Hussnigg | Nov. 3, 1953 |
| 2,760,549 | Nash et al. | Aug. 28, 1956 |
| 2,768,430 | Foogde et al. | Oct. 30, 1956 |
| 2,881,517 | Carpenter et al. | Apr. 14, 1959 |
| 2,888,042 | St. John et al. | May 26, 1959 |
| 2,954,803 | Barnes | Oct. 4, 1960 |
| 3,023,787 | Phillips et al. | Mar. 6, 1962 |